United States Patent
Engel et al.

(10) Patent No.: US 10,695,983 B2
(45) Date of Patent: Jun. 30, 2020

(54) GENERATIVE PRODUCTION DEVICE COMPRISING A MEASURING DEVICE

(71) Applicant: APWORKS GmbH, Taufkirchen (DE)

(72) Inventors: Franz Engel, München (DE); Andreas Nick, München (DE); Wolfgang Rehm, Hergensweiler (DE); Christian Weimer, München (DE)

(73) Assignee: APWORKS GmbH (DE)

( * ) Notice: Subject to any disclaimer, the term of this patent is extended or adjusted under 35 U.S.C. 154(b) by 154 days.

(21) Appl. No.: 15/735,282

(22) PCT Filed: May 23, 2016

(86) PCT No.: PCT/EP2016/061565
§ 371 (c)(1),
(2) Date: Dec. 11, 2017

(87) PCT Pub. No.: WO2016/202530
PCT Pub. Date: Dec. 22, 2016

(65) Prior Publication Data
US 2018/0169952 A1 Jun. 21, 2018

(30) Foreign Application Priority Data
Jun. 19, 2015 (DE) .................. 10 2015 007 790

(51) Int. Cl.
*B29C 64/371* (2017.01)
*B29C 64/393* (2017.01)
(Continued)

(52) U.S. Cl.
CPC .......... *B29C 64/393* (2017.08); *B22F 3/1055* (2013.01); *B23K 26/032* (2013.01);
(Continued)

(58) Field of Classification Search
CPC ....... B29C 64/25; B29C 64/30; B29C 64/371; B29C 64/393
See application file for complete search history.

(56) References Cited

U.S. PATENT DOCUMENTS 5,427,733 A * 6/1995 Benda .................. B22F 3/1055
419/1
6,751,516 B1 6/2004 Richardson
(Continued)

FOREIGN PATENT DOCUMENTS

| CN | 101991467 A | 3/2011 |
|---|---|---|
| WO | 2014/179345 A1 | 11/2014 |
| WO | 2015/040433 A2 | 3/2015 |

OTHER PUBLICATIONS

Salzman et al, Determination of Gas Temperatures From Laser-Raman Scattering, NASA, TN D-6336, May 1971, pp. 1-33 (Year: 1971).*

(Continued)

*Primary Examiner* — Timothy Kennedy
(74) *Attorney, Agent, or Firm* — Lerner, David, Littenberg, Krumholz & Mentlik, LLP

(57) ABSTRACT

A device for the layer-wise additive production of a complex three-dimensional component has a measuring mechanism for continuously monitoring quality indicators during the production of the component, wherein the measuring mechanism and a bed with a material powder are surrounded, at least in regions, by a processing cell filled with a protective gas atmosphere and the material powder of an uppermost layer can be melted in a locally limited manner in a melting zone by means of at least one laser. The measuring mechanism has the at least one laser and at least one optical sensor for the priority detection of the quality indicators in the region of the melting zone, in particular by means of Raman spectroscopy. Consequently, any construc- (Continued)

Figure 1:
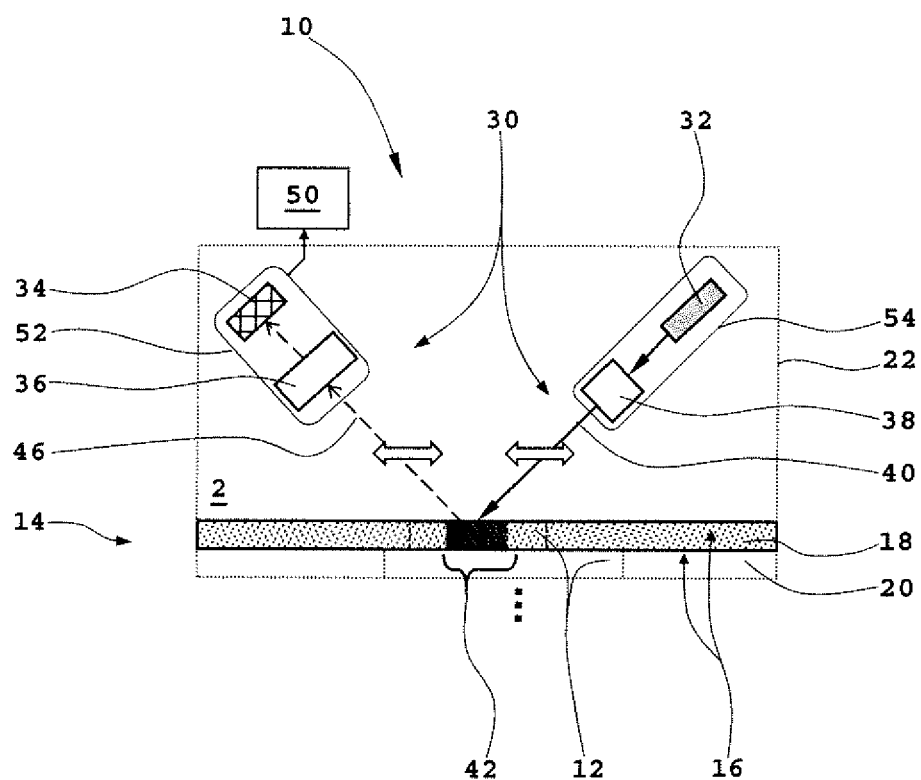

tion errors in the component can be recognised, evaluated and, if necessary, corrected in a resource-saving manner without delay.

18 Claims, 3 Drawing Sheets

(51) Int. Cl.
| | |
|---|---|
| *B33Y 30/00* | (2015.01) |
| *B33Y 50/02* | (2015.01) |
| *B22F 3/105* | (2006.01) |
| *G01K 11/12* | (2006.01) |
| *B23K 26/342* | (2014.01) |
| *B29C 64/153* | (2017.01) |
| *B23K 26/03* | (2006.01) |
| *B23K 26/12* | (2014.01) |
| *G01J 3/44* | (2006.01) |
| *G01N 21/65* | (2006.01) |
| *G01N 21/84* | (2006.01) |
| *G01N 21/3504* | (2014.01) |

(52) U.S. Cl.
CPC .......... *B23K 26/034* (2013.01); *B23K 26/123* (2013.01); *B23K 26/342* (2015.10); *B29C 64/153* (2017.08); *B29C 64/371* (2017.08); *B33Y 30/00* (2014.12); *B33Y 50/02* (2014.12); *G01J 3/4412* (2013.01); *G01K 11/125* (2013.01); *B22F 2003/1056* (2013.01); *B22F 2003/1057* (2013.01); *G01N 21/3504* (2013.01); *G01N 21/65* (2013.01); *G01N 2021/8411* (2013.01); *Y02P 10/295* (2015.11)

(56) References Cited

U.S. PATENT DOCUMENTS

| | | |
|---|---|---|
| 2005/0248758 A1 | 11/2005 | Carron et al. |
| 2011/0039016 A1 | 2/2011 | Beard |
| 2011/0049739 A1* | 3/2011 | Uckelmann ........ A61C 13/0013 264/16 |
| 2013/0193620 A1 | 8/2013 | Mironets et al. |
| 2014/0265049 A1 | 9/2014 | Burris et al. |

OTHER PUBLICATIONS

PCT/EP2016/061565 Search Report dated Sep. 14, 2016.
Liu, "Aerospace Testing Technology", Chinese National Defense Industry Publishing, Chinese Language, Nov. 1, 2013, 4 pages, ISBN: 9787118090758.
Chinese Office Action for Application No. CN201680035913.4 dated Jan. 15, 2020.

* cited by examiner

GENERATIVE PRODUCTION DEVICE COMPRISING A MEASURING DEVICE

CROSS-REFERENCE TO RELATED APPLICATIONS

The present application is a national phase entry under 35 U.S.C. § 371 of International Application No. PCT/EP2016/061565 filed May 23, 2016, published in German, which claims priority from German Patent Application No. 10 2015 007 790.2 filed Jun. 19, 2015, all of which are incorporated herein by reference.

The invention relates to a device, in particular for the layer-wise additive production of a complex three-dimensional component, having a measuring mechanism for continuously monitoring quality indicators, in particular the temperature and/or a chemical composition of the protective gas atmosphere, during production of the component, wherein the measuring mechanism and a bed with a material powder are surrounded, at least in regions, by a processing cell filled with a protective gas atmosphere and the material powder of an uppermost layer can be melted, in a locally limited manner, in a melting zone by means of at least one laser.

The additive layer manufacturing (ALM) method is known from the prior art, in which a laser briefly, in a targeted manner and locally, melts a material powder in a flat bed. The material powder that has been melted pointwise then hardens or solidifies again, so that complex three-dimensional components can be produced by a large number of powder layers layered one above the other, each containing a two-dimensional hardened geometry of the material powder. After each melting and hardening process, it is necessary to spread, by means of a doctor blade or a slider, a new powder layer of uniform material thickness over the layer having the locally hardened powder material located in each case therebelow. The thickness of the powder layers applied is in a range of up to 100 μm. The entire process is repeated until all the powder layers forming the three-dimensional component have been processed or partially melted by means of the laser. Upon removal of the material powder not rigidly bound by the melting and solidifying process, the finished three-dimensional component remains. The material powder may, for example, be a fine-grain, dust-like metal powder, a thermoplastic powder, a thermosetting plastics material powder or the like.

The quality of the components produced by means of the ALM method is influenced by numerous factors. Important influencing factors for the process quality are, for example, the temperature at the melting point, which predominantly depends on the laser output, and the homogeneity of the metal or plastics material powder used in each case as the starting material. Moreover, the process basically has to run under an inert protective gas atmosphere to avoid oxidation.

It is furthermore known that machines used for the ALM process detect the heat input into the material powder with the aid of the laser power in an indirect manner. Moreover, the chemical composition of the protective gas atmosphere within the device—if at all—is detected only pointwise. Consequently, too a high temperature may occur at the melting point. It is furthermore possible for oxygen to enter the protective gas atmosphere unnoticed or for a permissible residual oxygen concentration to be exceeded.

An object of the invention is therefore to specify a device for carrying out an ALM process, in which, in particular, a temperature increase at the melting point is avoided and the oxygen concentration in the region of the melting point is monitored.

This object is firstly achieved in that the measuring mechanism has the at least one laser and at least one optical sensor for the priority detection of the quality indicators in the region of the melting zone, in particular by means of Raman spectroscopy.

Process errors, such as, for example, oxidation of the component or splashes of molten material powder can thereby be recognised at an early stage during the running ALM process with high spatial resolution and can quickly be remedied for the future by a suitable adaptation of process parameters. What is known as rotational Raman scattering is preferably detected by means of the at least one sensor. For example, it emerges from the measurement of the Raman spectrum whether the melting of the material powder takes place in a stable manner, in other words, within the framework of predefined tolerances. In addition, the temperature in the region of the melting zone can be determined on the basis of the size of the rotational Raman line. The Raman spectrum can moreover be used to determine the energy or the temperature in the melting zone.

In the context of this description, the term "quality indicators" inter alia defines a measure of the temperature in the region of the melting zone, the presence of undesired gases, any undesired oxidation of the component, a degree of crystallinity or a degree of crystallisation of the molten material powder in the melting zone, the stability of the melting process, any splashes of material as well as, in the case of a thermosetting or thermoplastic material powder, in particular its degree of cross-linking and the influence of a fibre reinforcement. The measuring mechanism inter alia allows the detection of the spatial position of the melting zone in relation to the component to be produced by the ALM process, the intensity of the laser radiation emitted by the laser in the melting zone, the extent and the intensity distribution of the melting zone, the presence of oxygen in the protective gas atmosphere, the rotational Raman scattering for temperature measurement in the melting zone as well as the spectrum of the melting zone.

In the case of one embodiment, the optical sensor can track the melting zone by means of a guide system. A very precise measurement is thereby possible in the melting zone.

In a further advantageous embodiment, a working region of the laser can be detected by means of the optical sensor. A planar measurement can be achieved thereby. The term "working region" is to be taken to mean that region of the bed with the material powder, which can be irradiated by the laser radiation by a corresponding positioning of the laser by means of the guide system.

According to a further embodiment, at least one predefined and fixed region can be detected by means of the optical sensor. As a result, a simplified design structure of the measuring mechanism is produced, which allows a measurement on a random basis in this constellation on at least one predefined region of the component.

According to one development, an optical system is in each case associated with the laser and/or the sensor. As a result, a targeted and comprehensive beam influencing of the laser radiation emitted by the laser is possible. This optical system may comprise, for example, lenses, in particular convex or concave lenses, filters, polarisers, mirrors or the like.

In a further embodiment, the optical sensor is integrated in a guide system of the at least one laser for spatial positioning of the laser with respect to the component. As a result, a considerable simplification of the design structure of the device is produced, as the guide system of the (melting) laser can also be used to move the measuring mechanism.

In the case of a further embodiment, laser radiation emitted by the at least one laser can be deflected by means of a semi-permeable mirror onto the material powder of the uppermost layer of the bed and a measuring radiation scattered by the material powder can be fed, after the deflection-free passage through the mirror, to the at least one optical sensor. As a result, a space-saving structure of the device is provided.

According to a further embodiment, laser radiation emitted by the at least one laser runs through a semi-permeable mirror in a deflection-free manner and a measuring radiation scattered by the material powder of the uppermost layer of the bed, after a deflection by means of the mirror, can be fed to the at least one optical sensor. Consequently, the necessity for a deflection of the particularly strong laser radiation emitted by the laser is dispensed with.

According to a further embodiment, the at least one optical sensor and an optical system associated therewith in each case are arranged coaxially with the at least one laser. Consequently, a spatially even more compact structure of the device can be realised.

An electronic evaluation unit is preferably associated with the measuring mechanism. As a result, a comprehensive numerical evaluation and analysis of the measured values supplied by the at least one sensor for a complex quality analysis in a running ALM process to be monitored is possible, said quality analysis preferably taking place for this purpose in real time or online.

A spatial position of the melting zone in relation to the component and/or a temperature in the region of the melting zone can preferably be contactlessly detected by means of the at least one optical sensor. As a result, the measured values can be associated with defined coordinates of the component so that regions of the component, in which inadmissible deviations of the quality indicators have been found, can be further investigated at any time.

The temperature in the region of the melting zone can preferably be detected by the detection of an infrared radiation quantity or a rotational Raman radiation by means of the at least one sensor. As a result, it is possible to detect the local temperature in the region of the melting zone with a high degree of precision. Planck's thermal radiation within the infrared spectrum is measured here in the melting zone by means of the optical sensor configured in this case, for example, as a bolometer or as a pyrometer and the temperature of the melting zone is calculated from this with the aid of the evaluation unit. Alternatively, the Raman scattering within the protective gas atmosphere can be detected by means of the at least one sensor. Depending on the temperature of the gas at a measured point, which is defined by the laser radiation emitted by the laser, the rotational Raman radiation has a different width and intensity. By means of a narrow-band optical filter, which filters out the original laser radiation, the remaining radiation of the spectrum can be measured by means of the optical sensor and therefore the temperature can be determined.

In the case of a further configuration, oxygen and/or other gases within the protective gas atmosphere can be detected by an infrared line absorption or a Raman shift by means of at least one sensor and a measuring laser. As a result, undesired gases in the protective gas atmosphere can be reliably detected. For this purpose, for example an additional laser then acting as a measuring laser, which is matched to an oxygen line in the optical spectrum, is guided through the processing cell. At one end of the path of the laser radiation emitted by the measuring laser is a correspondingly configured optical sensor, which detects the absorption of the laser radiation taking place when oxygen molecules are present.

Oxygen and/or other gases in the protective gas atmosphere can preferably be detected by means of the at least one sensor and the at least one laser with the aid of a dye and/or an intensity of the measuring radiation scattered on the material powder. As a result, undesired gases or gas molecules "poisoning" the protective gas atmosphere can be reliably detected. In this constellation, the laser or the melting laser is simultaneously used as a measuring laser. When oxygen or oxygen molecules occur in the protective gas atmosphere, a rotational-vibrational Raman line of the Q-branch, which can be detected by a narrow-band optical filter and a correspondingly configured optical sensor, is produced in the optical spectrum. In this case, an alarm signal can be emitted, for example by means of the evaluation unit.

According to one advantageous configuration, the quality indicators, in particular an oxidation of the component and a degree of crystallinity in the melting zone, can be determined by means of the evaluation unit. As a result, the quality of the component formed by the melting and solidifying of the material powder taking place layer-wise can be monitored continuously and with a high degree of precision. In the case of a significant worsening of the quality indicators, which indicates errors relevant to quality in the ALM process, the production process can be readjusted and also completely interrupted.

Figure 2:
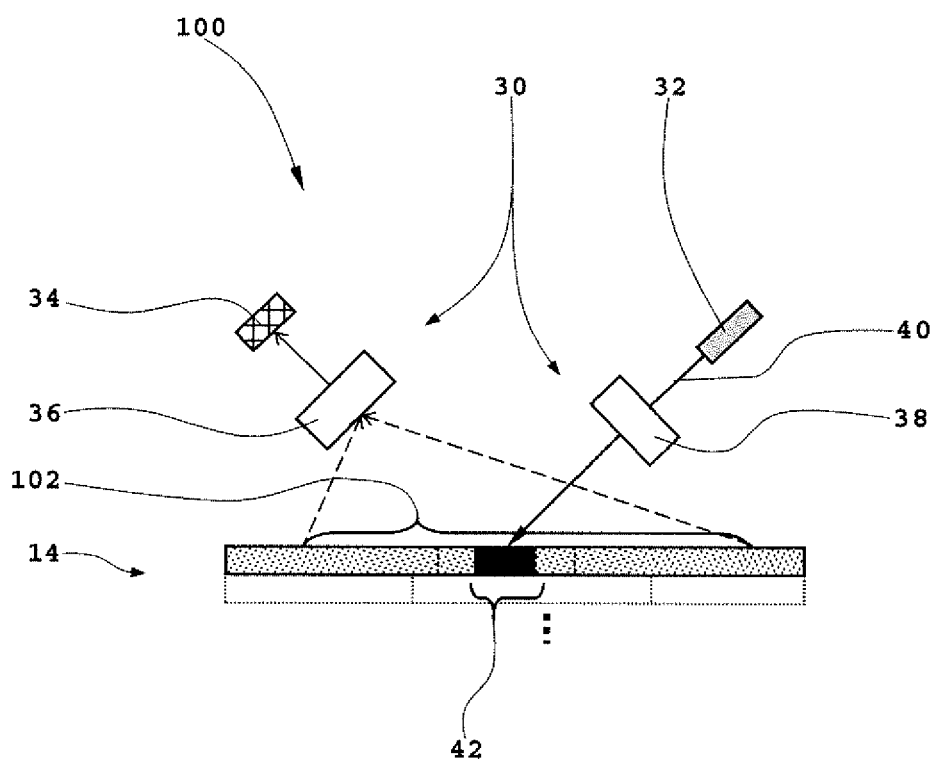
Figure 3:
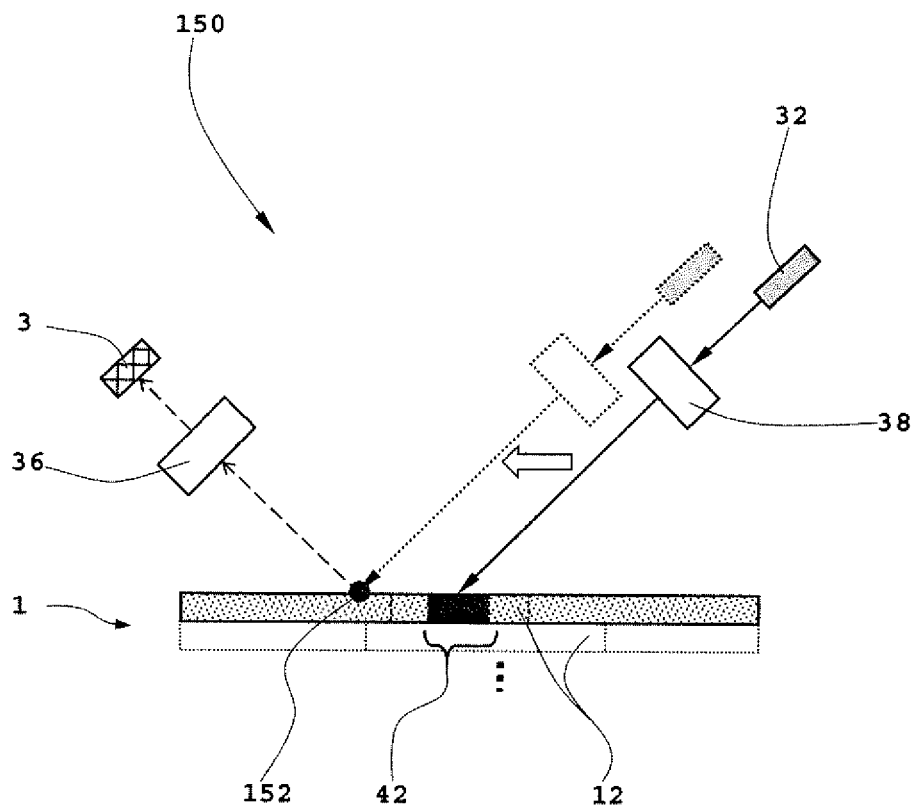
Figure 4:
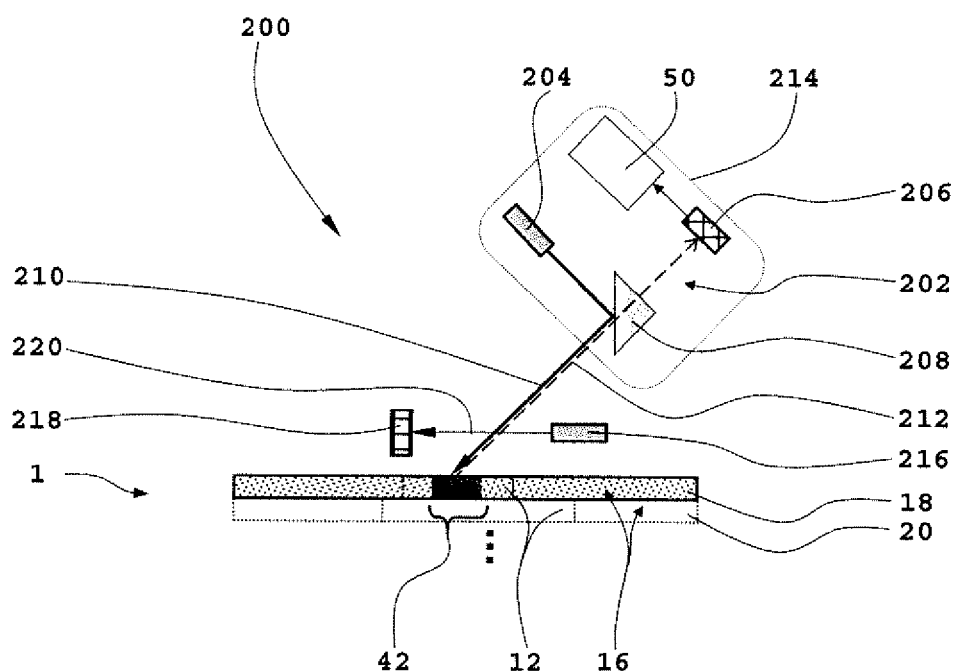
Figure 5:
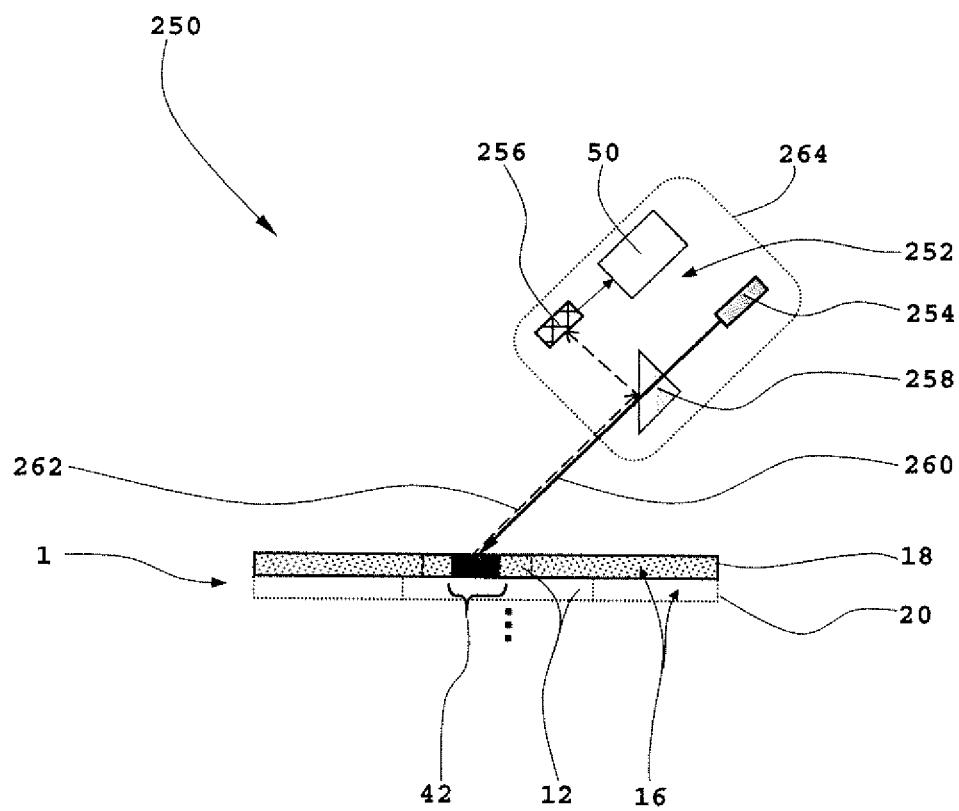
Figure 6:
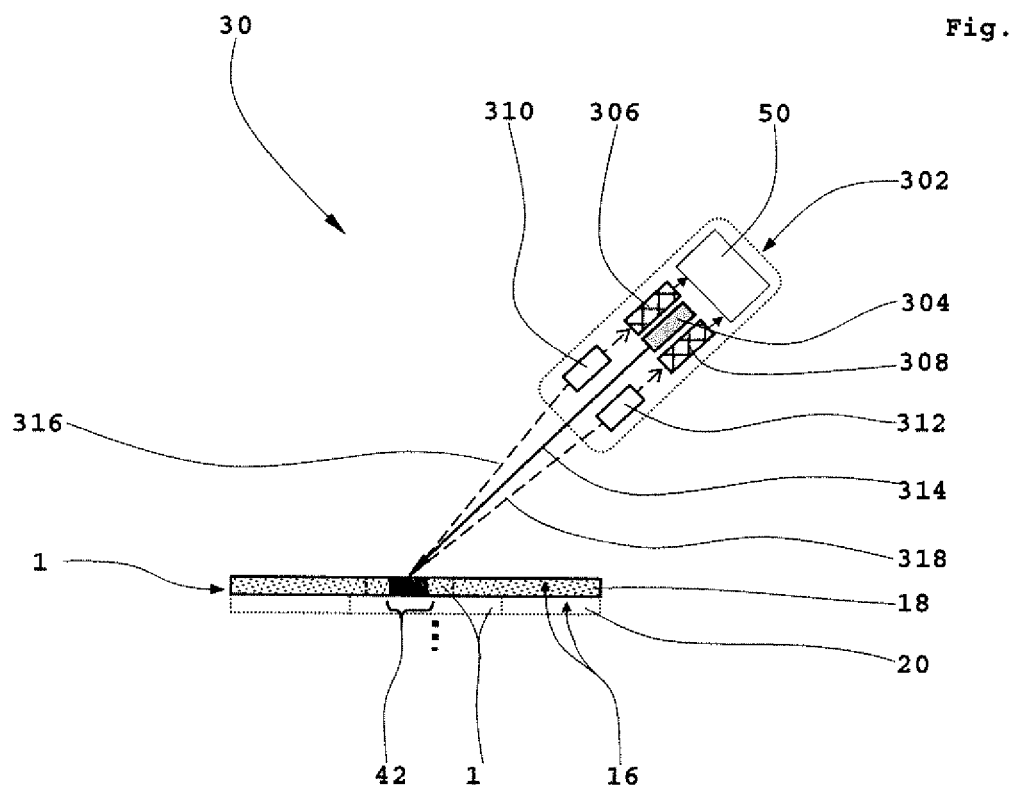

In the drawings:

FIG. 1 is a view of a first embodiment of the device,
FIG. 2 is a view of a second embodiment of the device,
FIG. 3 is a view of a third embodiment of the device,
FIG. 4 is a view of a fourth embodiment of the device,
FIG. 5 is a view of a fifth embodiment of the device,
FIG. 6 is a view of a sixth embodiment of the device.

FIG. 1 is a schematic diagram of a first embodiment of a device. A device 10 for producing a complex three-dimensional component 12 by the ALM method inter alia comprises a planar bed 14, which is formed by a large number of thin layers of a material powder 16, of which only two layers 18, 20 are drawn in here. The material powder 16 may be a thermoplastic material powder, a thermosetting material powder or a metallic material powder. Furthermore, the device 10 comprises a processing cell 22, which is filled with an inert protective gas atmosphere 24. Moreover, the device 10 has a measuring mechanism 30, which is formed by a laser 32 and an optical sensor 34. An optional optical system 36, 38 may be connected upstream of both the laser 32 and the sensor 34. A melting zone 42 in the uppermost layer 18 of the bed 14 can be melted temporarily by means of a monochrome laser radiation 40 emitted by the laser 32. After the melting process, the melting zone 42 generally automatically hardens or solidifies and forms a hardened or hard layer of the component 12 to be produced by the ALM process. A measuring radiation 46 is scattered back or thrown back by the melting zone 42 and is detected by the sensor 34 to determine the quality indicators of the ALM process mentioned at the outset.

The quality indicators are determined inter alia by means of Raman spectroscopy of the scattered measuring radiation 46 with the aid of the sensor 34, but can also take place with the aid of other optical measuring methods.

The measured values supplied by the optical sensor 34 are preferably evaluated by means of a digital electronic evaluation unit 50 in real time. In the case of the first embodiment of the device illustrated here, the optical sensor 34 including the optical system 36 can be freely positioned in relation to the bed 14 by means of a guide system 52 and, as a result, can track the laser 32 and its optical system 38, which can likewise be freely positioned in the space, by means of a guide system 54—as indicated by the two white double arrows—so that the quality indicators are preferably always determined in the region of the melting zone 42. Moreover, at least one quality indicator can be allocated by means of the evaluation unit 50, if necessary, to each coordinate of the component 12 to facilitate the search for errors, the spatial resolution power substantially only being limited by the positioning precision of the guide systems 52, 54. The control or regulation of the two guide systems 52, 54 and all the further components requiring regulation of the device 10 preferably likewise takes place by means of the evaluation unit 50.

A contactless optical temperature measurement can take place, for example, by a detection of the infrared radiation quantity in the melting zone 42 by means of the sensor 34. Planck's thermal radiation is optically detected here at the melting point of the laser beam and the radiation quantity within an infrared spectrum is detected by means of the sensor 34 configured as a bolometer or pyrometer and the temperature is calculated from this by means of the evaluation unit 50.

Moreover, a contactless optical temperature measurement is possible by measuring the rotational Raman scattering. For this purpose, the Raman scattering of the laser radiation 40 in the protective gas atmosphere 24 is measured in the region of the melting zone 42 and evaluated by means of the evaluation unit 50. Depending on the temperature of the protective gas atmosphere 24, the rotational Raman scattering has a different width and intensity. In a constellation of this type, the optical system 36 arranged upstream of the optical sensor 34 is configured as a narrow-band optical filter, which filters out the original laser radiation 40, so that the remaining radiation of the spectrum can be measured by means of the sensor 34 and the temperature can be calculated with the aid of the evaluation unit 50.

Furthermore, oxygen fractions in the protective gas atmosphere 24 can be recognised by means of a Raman shift by means of the sensor 34. For this purpose, the (melting) laser 32 itself is also used as a measuring laser. When oxygen molecules occur in the protective gas atmosphere 24, a rotational-vibrational Raman line of the Q-branch will occur in the optical spectrum, which Raman line can in turn be detected with a narrow-band optical filter, so that an alarm from the evaluation unit 50 can be given and/or the ALM process can be automatically interrupted by the evaluation unit 50.

FIG. 2 shows a further embodiment of a device. A device 100 substantially has the same design structure as the first embodiment of the device according to FIG. 1. The laser 32 with the upstream optical system 38 and the sensor 34 with the upstream optical system 36 in turn form the measuring mechanism 30. In contrast to the embodiment of FIG. 1, however, a working region 102 of the laser 32 and the optical system 36 can be completely detected by means of the sensor 34 and the optical system 36 associated therewith, so that no guide system is necessary for the sensor 34 and its optical system 36 for positioning in relation to the bed 14. The melting zone 42 is always located here within the working region 102. The working region 102 is that area of the bed 14 that can be detected by the laser radiation 40 of the laser 32.

FIG. 3 illustrates a further embodiment of a device. A device 150 in turn substantially comprises the same design elements as the embodiment of FIG. 2. However, in contrast to this, only a predefined region 152, which is fixed with respect to the bed 14, can be detected by means of the sensor 34 and the optical system 36 associated therewith, so that only a pointwise measurement on a random basis is possible. The melting zone 42, depending on the respective position of the laser 32 and its optical system 38 with respect to the bed 14, may be congruent with the predefined region 152 or be located outside it. In the embodiment shown of FIG. 3, the melting zone 42 only arrives in the predefined region 152 when the laser 32 together with the optical system—as indicated by the while arrow—has adopted the position indicated by dotted lines in relation to the bed 14.

In general, a large number of regions 152 are necessary, which are preferably localised in those portions of the component 12, in which the quality indicators are more frequently located outside predetermined specifications or limit values.

FIG. 4 illustrates a fourth embodiment of a device. A device 200 inter alia comprises a measuring mechanism 202, which is constructed with a laser 204, an optical sensor 206 and a semi-permeable mirror 208. The laser 204, in addition to its primary function as a (melting) laser 204 for melting the material powder 16 of the uppermost of the two layers 18, 20 in the region of the melting zone 42 of the bed 14, is simultaneously used as a measuring laser to monitor the quality indicators in the region of the melting zone 42 in cooperation with the optical sensor 206. For this purpose, a laser radiation 210 produced by the laser 204 is deflected here by way of example through 90° by means of the semi-permeable mirror 208 and is input into the melting zone 42 of the bed 14. A measuring radiation 212 scattered or thrown back by the melting zone 42 runs, in portions, parallel to the laser radiation 210, passes through the semi-permeable mirror 208, without undergoing a change of direction, and falls on the optical sensor 206, the measured values of which are in turn fed to the electronic, digital evaluation unit 50 to calculate the quality indicators or the quality characteristics. The laser 204 and the measuring mechanism 202 can be freely moved by means of a guide system 214 with respect to the bed 14 and, as a result, the component 12 can be produced with a high degree of precision in the course of the layer-wise additively proceeding ALM process. A processing cell with a protective gas atmosphere necessary to avoid oxidation processes is not shown for the sake of better graphic clarity.

Furthermore, a measuring laser 216 and a further optical sensor 218 may be provided. The measuring laser 216 is, for example, matched to an oxygen line in the optical spectrum and accordingly emits a (measuring) laser radiation 220 at a corresponding frequency. This laser radiation 220 is guided parallel to the bed 14 by the processing cell (not shown here), with the protective gas atmosphere and, after passing through the melting zone 42, impinges on the correspondingly sensitively configured optical sensor 218, which detects the absorption of laser radiation 220, which takes place when undesired oxygen molecules are present, and also relays it to the evaluation unit 50.

The fourth embodiment shown schematically here, in comparison to the first three embodiments, allows a space-saving mode of construction, since the laser 204, as a melting laser and as a measuring laser, carries out a double functionality.

FIG. 5 shows a fifth embodiment of the device, which embodies a sub-variant of the fourth embodiment. A device 250 again comprises a measuring mechanism 252 having a laser 254, an optical sensor 256, a semi-permeable mirror 258 and an evaluation unit 50. The material powder 16 of the uppermost of the two layers 18, 20 is liquefied in the region of the melting zone 42 by means of a laser radiation 260 produced by the laser 254. The material powder 16 then solidifies in the melting zone 42. As a result, the component 12 to be produced is constructed in a layer-wise additive manner. The structure of the fifth embodiment corresponds to the structure of the fourth embodiment of the device according to FIG. 4 with the substantial difference that the arrangement of the laser 254 and sensor 256 is transposed with respect to the semi-permeable mirror 258.

FIG. 6 illustrates a sixth embodiment of the device. A device 300, in contrast to the above configurations, comprises a measuring mechanism 302 having a laser 304, two optical sensors 306, 308, each with an upstream optical system 310, 312, as well as the evaluation unit 50. The measuring mechanism 302, which simultaneously has the melting function, can at least be moved parallel to the bed 14 in the space with the aid of a guide system (not shown). The material powder 16 of the uppermost of the two layers 18, 20 is temporarily liquefied by means of a laser radiation 314 emitted by the laser 304 primarily in the region of the melting zone 42, to then be automatically hardened again in the course of the ALM process to create the component 12. Measuring radiation 316, 318 scattered or thrown back by the melting zone 42 arrives through the associated optical systems 310, 312 on the respectively associated optical sensors 306, 308, the measured values of which are processed to form the quality indicators with the aid of the evaluation unit 50. In contrast to the above configurations, by way of example two optical sensors 306, 308 are arranged coaxially with the laser 304 in the measuring mechanism 302, as a result of which inter alia a further reduction in the installation space is possible and the guide system of the laser 304 can also be used.

Moreover, the temperature of the melting zone 42 can be detected by means of the first sensor 306, for example by Raman spectroscopy of the measuring radiation 316 and, with the aid of the second measuring radiation 318 and the second sensor 308 in conjunction with a suitable measuring method, for example, a conclusion can simultaneously be drawn about the presence of undesired oxygen atoms or other gases in the protective gas atmosphere (not shown here) within the processing cell.

Furthermore, a measurement of a Raman line can take place by means of at least one of the two sensors 306, 308 before the laser radiation 314 impinges on the melting zone 42.

With the ALM device 10 according to the invention, the quality of the constructed component 12 can be detected simultaneously and, accordingly, in a time-saving manner, with the actual production process. When there are inadmissible deviations from predetermined limit values, whereby a falling below of the quality is generally indicated, the ALM manufacturing process can be interrupted automatically, controlled by the evaluation unit 40. This can avoid the wasting of resources or the application of a new layer of material powder 16 and a renewed scanning or measuring by means of the optical sensors. Moreover, the quality indicators determined by the device 10, which preferably correlate with specified component coordinates, allow a reliable estimation about whether a construction error is to be classified as critical or not.

LIST OF REFERENCE NUMERALS 10 device
12 component
14 bed
16 material powder
18 layer (material powder)
20 layer (material powder)
22 processing cell
24 protective gas atmosphere
30 measuring mechanism
32 laser
34 optical sensor
36 optical system
38 optical system
40 laser radiation
42 melting zone
46 measuring radiation
50 evaluation unit
52 guide system (sensor)
54 guide system (laser)
100 device ($2^{nd}$ var.)
102 working region
150 device ($3^{rd}$ var.)
152 predefined region
200 device ($4^{th}$ var.)
204 laser
206 optical sensor
208 semi-permeable mirror
210 laser radiation
212 measuring radiation
214 guide system
216 measuring laser
218 optical sensor
220 (measuring) laser radiation
250 device ($5^{th}$ var.)
252 measuring mechanism
254 laser
256 optical sensor
258 semi-permeable mirror
260 laser radiation
262 measuring radiation
264 guide system
300 device ($6^{th}$ var.)
302 measuring mechanism
304 laser
306 optical sensor
308 optical sensor
310 optical system
312 optical system
314 laser radiation
316 measuring radiation
318 measuring radiation

The invention claimed is:

1. A device for the layer-wise additive production of a three-dimensional component, comprising:
   a measuring mechanism for continuously monitoring quality indicators, during the production of the component, and
   a first guide system,
   wherein the measuring mechanism and a bed with a material powder are surrounded, at least in regions, by a processing cell filled with a protective gas atmosphere and the material powder of an uppermost layer can be melted in a locally limited manner in a melting zone by at least one laser, and
   wherein the measuring mechanism has the at least one laser and at least one optical sensor for the priority detection of the quality indicators in the region of the melting zone, wherein the quality indicators comprise at least one of the temperature and a chemical composition of the protective gas atmosphere, and wherein the at least one laser is configured to be freely positioned in space within the processing cell by the first guide system.

2. The device of the claim 1, wherein the at least one optical sensor is configured to detect the quality indicators by Raman spectroscopy.

3. The device of claim 1, wherein the optical sensor is configured to track the melting zone by a second guide system.

4. The device of claim 1, wherein the optical sensor is configured to detect a working region of the laser.

5. The device of claim 1, wherein the optical sensor is configured to detect at least one predefined and fixed region.

6. The device of claim 1, wherein an optical system is associated with at least one of the laser and the optical sensor.

7. The device of claim 1, wherein the optical sensor is integrated in the first guide system of the at least one laser to spatially position the laser with respect to the component.

8. The device of claim 7, wherein a semi-permeable mirror is configured to deflect laser radiation emitted by the at least one laser onto the material powder of the uppermost layer of the bed, and wherein the at least one optical sensor is configured to receive a measuring radiation scattered by the material powder, after the deflection-free passage through the mirror.

9. The device of claim 7, wherein a semi-permeable mirror is configured to transmit laser radiation emitted by the at least one laser in a deflection-free manner, and wherein the at least one optical sensor is configured to receive a measuring radiation scattered by the material powder of the uppermost layer of the bed, after a deflection by the mirror.

10. The device of claim 1, wherein the at least one optical sensor and an optical system associated therewith are arranged about a first axis, wherein the first axis is coaxial with a second axis of the at least one laser.

11. The device of claim 1, wherein an electronic evaluation unit is associated with the measuring mechanism.

12. The device of claim 1, wherein the at least one optical sensor is configured to contactlessly detect at least one of a spatial position of the melting zone in relation to the component and a temperature in the region of the melting zone.

13. The device of claim 12, wherein the temperature in the region of the melting zone is configured to be detected by the detection of an infrared radiation quantity or by the at least one sensor.

14. The device of claim 12, wherein the temperature in the region of the melting zone is configured to be detected by the detection of a rotational Raman radiation by the at least one sensor.

15. The device of claim 1, wherein at least one of oxygen and other gases within the protective gas atmosphere is configured to be detected by an infrared line absorption by at least one sensor and a measuring laser.

16. The device of claim 1, wherein at least one of oxygen and other gases within the protective gas atmosphere is configured to be detected by a Raman shift by at least one sensor and a measuring laser.

17. The device of claim 1, wherein at least one of oxygen and other gases in the protective gas atmosphere is configured to be detected with at least one of the aid of a dye and an intensity of the measuring radiation scattered on the material powder by the at least one sensor and the at least one laser, wherein the quality indicators can be determined by means of the evaluation unit.

18. The device of claim 17, wherein the quality indicators comprise an oxidation of the component and a degree of crystallinity in the melting zone.

\* \* \* \* \*